(12) United States Patent
Hu

(10) Patent No.: US 12,160,594 B2
(45) Date of Patent: Dec. 3, 2024

(54) METHOD AND APPARATUS FOR PROCESSING NON-SEQUENTIAL POINT CLOUD MEDIA, DEVICE, AND STORAGE MEDIUM

(71) Applicant: Tencent Technology (Shenzhen) Company Limited, Shenzhen (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 140 days.

(21) Appl. No.: 17/969,627

(22) Filed: Oct. 19, 2022

(65) Prior Publication Data

US 2023/0048474 A1    Feb. 16, 2023

Related U.S. Application Data

(63) Continuation of application No. PCT/CN2021/131037, filed on Nov. 17, 2021.

(30) Foreign Application Priority Data

Nov. 26, 2020   (CN) .......................... 202011347626.1

(51) Int. Cl.
  *H04N 19/23*    (2014.01)
  *H04N 19/119*    (2014.01)
  (Continued)

(52) U.S. Cl.
  CPC .......... *H04N 19/23* (2014.11); *H04N 19/119* (2014.11); *H04N 19/136* (2014.11);
  (Continued)

(58) Field of Classification Search
  None
  See application file for complete search history.

(56) References Cited

U.S. PATENT DOCUMENTS

| 2020/0226792 A1 | 7/2020 | Wang et al. |
| 2020/0302655 A1 | 9/2020 | Oh |
| 2021/0105313 A1* | 4/2021 | Wang ..................... H04L 65/70 |

FOREIGN PATENT DOCUMENTS

| CN | 110781894 A | 2/2020 |
| CN | 111277904 A | 6/2020 |

(Continued)

OTHER PUBLICATIONS

Tencent Technology, WO, PCT/CN2021/131037, Feb. 10, 2022, 5 pgs.

(Continued)

*Primary Examiner* — Xiaolan Xu
(74) *Attorney, Agent, or Firm* — Morgan, Lewis & Bockius LLP

(57) ABSTRACT

This application provides a method and apparatus for processing non-sequential point cloud media, a device, and a storage medium. The method includes: processing non-sequential point cloud data of a static object using a Geometry-based Point Cloud Compression (GPCC) coding scheme to obtain a GPCC bitstream; encapsulating the GPCC bitstream to generate an item of at least one GPCC region; encapsulating the item of the at least one GPCC region to generate at least one piece of non-sequential point cloud media of the static object; transmitting media presentation description (MPD) signaling of the at least one piece of non-sequential point cloud media; receiving a first request message transmitted by a video playback device; and transmitting first non-sequential point cloud media, the item of the GPCC region being used to represent a GPCC component of a three-dimensional (3D) spatial region corresponding to the GPCC region, and the non-sequential point cloud media including: an identifier of the static object, so that a user can purposefully request non-sequential point cloud (Continued)

media of a same static object a plurality of times, thereby improving the user experience.

17 Claims, 7 Drawing Sheets

(51) Int. Cl.
*H04N 19/136* (2014.01)
*H04N 19/164* (2014.01)
*H04N 19/167* (2014.01)
*H04N 19/17* (2014.01)

(52) U.S. Cl.
CPC ......... *H04N 19/164* (2014.11); *H04N 19/167* (2014.11); *H04N 19/17* (2014.11)

(56) References Cited

FOREIGN PATENT DOCUMENTS

| TW | 202029757 A | 8/2020 |
|----|-------------|--------|
| TW | 202041020 A | 11/2020 |
| WO | WO 2020060813 A1 | 3/2020 |
| WO | WO 2020/137642 A1 | 7/2020 |

OTHER PUBLICATIONS

Tencent Technology, IPRP, PCT/CN2021/131037, May 30, 2023, 6 pgs.
Tencent Technology, ISR, PCT/CN2021/131037, Feb. 10, 2022, 2 pgs.
Tencent Technology, Extended European Search Report, EP21896844.4, Apr. 9, 2024, 11 pgs.
Ahmed Hamza et al., "[PCC Systems] Harmonized Solution for Partial Access Metadata", No. m53949, International Organization for Standardization, ISO/IEC JTC1/SC29/WG11, Coding of Moving Pictures and Audio, Electronic Meeting, Apr. 2020, 8 pgs.
Basel Salahieh et al., "Object-Based Applications for Video Point Cloud Compression", No. MPEG2019/m50950, International Organization for Standardization, ISO/IEC JTC1/SC29/WG11, Coding of Moving Pictures and Audio, Geneva, Switerland, Oct. 2019, 5 pgs.
Sejin Oh et al., "Text of ISO /IEC DIS 23090-18 Carriage of Geometry-Based Point Cloud Compression Data", No. N0075, International Organization for Standardization, ISO/IEC JTC 1/SC 29/WG 03, MPEG Systems, Electronic Meeting, Oct. 2020, 47 pgs.
Ying Hu et al., "On Carriage of Non-Timed G-PCC Data", No. m056011, International Organization for Standardization, ISO/IEC JTC 1/SC 29/WG 3, Coding of Moving Pictures and Audio, Electronic Meeting: Jan. 2021, 5 pgs.

* cited by examiner

METHOD AND APPARATUS FOR PROCESSING NON-SEQUENTIAL POINT CLOUD MEDIA, DEVICE, AND STORAGE MEDIUM

CROSS-REFERENCE TO RELATED APPLICATIONS

This application is a continuation application of PCT Patent Application No. PCT/CN2021/131037, entitled "METHOD AND APPARATUS FOR PROCESSING NON-SEQUENTIAL POINT CLOUD MEDIA, DEVICE AND STORAGE MEDIUM" filed on Nov. 17, 2021, which claims priority to Chinese Patent Application No. 202011347626.1, filed with the State Intellectual Property Office of the People's Republic of China on Nov. 26, 2020, and entitled "METHOD AND APPARATUS FOR PROCESSING NON-SEQUENTIAL POINT CLOUD MEDIA, DEVICE, AND STORAGE MEDIUM", all of which are incorporated herein by reference in their entirety.

FIELD OF THE TECHNOLOGY

Embodiments of this application relate to the field of computer technologies, and in particular, to non-sequential point cloud media.

BACKGROUND OF THE DISCLOSURE

Point cloud data of objects can be obtained in many ways at present. Video production devices can transmit point cloud data to video playback devices in the form of point cloud media, that is, point cloud media files, for the video playback devices to play the point cloud media.

The point cloud data for the same object can be encapsulated into different point cloud media, for example, some point cloud media is overall point cloud media of the object, while some point cloud media is only parts of the point cloud media of the object.

SUMMARY

This application provides a method and an apparatus for processing non-sequential point cloud media, a device, and a storage medium, so that a user can purposefully request non-sequential point cloud media of a same static object a plurality of times, thereby improving the processing efficiency and the user experience.

According to an aspect, this application provides a method for processing non-sequential point cloud media, performed by a computer device, the method including: obtaining non-sequential point cloud data of a static object; processing the non-sequential point cloud data using a Geometry-based Point Cloud Compression (GPCC) coding scheme to obtain a GPCC bitstream; encapsulating the GPCC bitstream to generate an item of at least one GPCC region, the item of the GPCC region being used to represent a GPCC component of a three-dimensional (3D) spatial region corresponding to the GPCC region; encapsulating the item of the at least one GPCC region to generate at least one piece of non-sequential point cloud media of the static object, the non-sequential point cloud media including an identifier of the static object; transmitting media presentation description (MPD) signaling of the at least one piece of non-sequential point cloud media to a video playback device; receiving a first request message transmitted by the video playback device according to the MPD signaling, the first request message being used to request first non-sequential point cloud media in the at least one piece of non-sequential point cloud media; and transmitting the first non-sequential point cloud media to the video playback device according to the first request message.

According to another aspect, this application provides a method for processing non-sequential point cloud media, performed by a video playback device, the method including: receiving MPD signaling of at least one piece of non-sequential point cloud media, the non-sequential point cloud media including an identifier of a static object; transmitting a first request message to a video production device according to the MPD signaling, the first request message being used to request first non-sequential point cloud media in the at least one piece of non-sequential point cloud media; receiving the first non-sequential point cloud media from the video production device; playing the first non-sequential point cloud media, the at least one piece of non-sequential point cloud media being generated by encapsulating an item of at least one GPCC region, the item of the at least one GPCC region being generated by encapsulating a GPCC bitstream, the GPCC bitstream being obtained by processing non-sequential point cloud data of the static object using a GPCC coding scheme; and for an item of any GPCC region in the item of the at least one GPCC region, the item of the GPCC region being used to represent a GPCC component of a 3D spatial region corresponding to the GPCC region.

According to another aspect, this application provides an apparatus for processing non-sequential point cloud media, including: a processing unit and a communication unit, the processing unit being configured to: obtain non-sequential point cloud data of a static object; process the non-sequential point cloud data using a GPCC coding scheme to obtain a GPCC bitstream; encapsulate the GPCC bitstream to generate an item of at least one GPCC region, the item of the GPCC region being used to represent a GPCC component of a 3D spatial region corresponding to the GPCC region; encapsulate the item of the at least one GPCC region to generate at least one piece of non-sequential point cloud media of the static object, the non-sequential point cloud media including an identifier of the static object; and transmit MPD signaling of the at least one piece of non-sequential point cloud media to a video playback device; and the communication unit being configured to: receive a first request message transmitted by the video playback device according to the MPD signaling, the first request message being used to request first non-sequential point cloud media in the at least one piece of non-sequential point cloud media; and transmit the first non-sequential point cloud media to the video playback device according to the first request message.

According to another aspect, this application provides an apparatus for processing non-sequential point cloud media, including: a processing unit and a communication unit, the communication unit being configured to: receive MPD signaling of at least one piece of non-sequential point cloud media, the non-sequential point cloud media including an identifier of a static object; transmit a first request message to a video production device according to the MPD signaling, the first request message being used to request first non-sequential point cloud media in the at least one piece of non-sequential point cloud media; and receive the first non-sequential point cloud media from the video production device; and the processing unit being configured to play the first non-sequential point cloud media, the at least one piece of non-sequential point cloud media being generated by encapsulating an item of at least one GPCC region, the item of the at least one GPCC region being generated by encapsulating a GPCC bitstream, the GPCC bitstream being obtained by processing non-sequential point cloud data of the static object using a GPCC coding scheme, and for an item of any GPCC region in the item of the at least one GPCC region, the item of the GPCC region being used to represent a GPCC component of a 3D spatial region corresponding to the GPCC region.

According to still another aspect, a computer device is provided, including a processor and a memory, the memory being configured to store a computer program, and the processor being configured to invoke and run the computer program stored in the memory and causing the computer device to perform the method according to the foregoing aspects.

According to still another aspect, a video playback device is provided, including a processor and a memory, the memory being configured to store a computer program, and the processor being configured to invoke and run the computer program stored in the memory to perform the method according to the foregoing aspects.

According to still another aspect, a non-transitory computer-readable storage medium is provided, configured to store a computer program, the computer program, when executed by a processor of a computer device, causing the computer device to perform the method according to the foregoing aspects.

According to still another aspect, an embodiment of this application provides a computer program product, including instructions, the instructions, when run on a computer, causing the computer to perform the method according to the foregoing aspects.

In summary, in this application, the video production device, when encapsulating the non-sequential point cloud media, may add the identifier of the static object to the non-sequential point cloud media, so that the user can purposefully request non-sequential point cloud media of a same static object a plurality of times, thereby improving the user experience.

Further, in this application, the 3D spatial region corresponding to the item of the GPCC region may be divided into a plurality of spatial sub-regions, which, in combination with the characteristic of independent coding and decoding of GPCC tiles, enables the user to decode and present the non-sequential point cloud media with higher efficiency and lower latency.

Further, the video production device can flexibly combine items of the plurality of GPCC regions to form different non-sequential point cloud media. The non-sequential point cloud media may constitute a complete GPCC frame or a partial GPCC frame, thereby improving the flexibility of video production.

DESCRIPTION OF EMBODIMENTS

Figure 1:
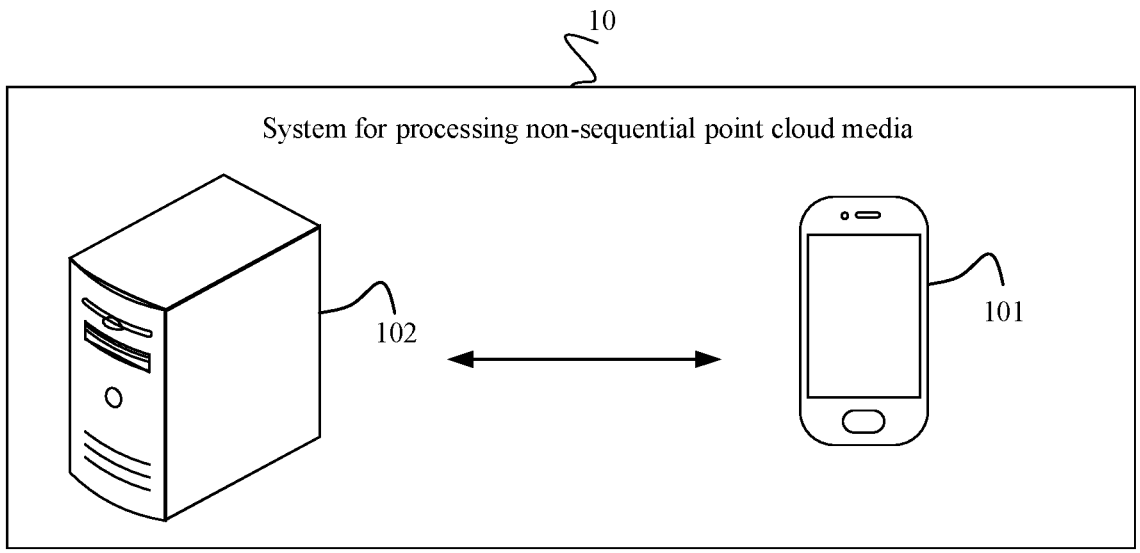
FIG. 1 is a schematic architectural diagram of a system for processing non-sequential point cloud media according to an exemplary embodiment of this application.

The following clearly and completely describes the technical solutions in the embodiments of this application with reference to the accompanying drawings in the embodiments of this application. Apparently, the described embodiments are merely some rather than all of the embodiments of this application. All other embodiments obtained by a person of ordinary skill in the art based on the embodiments of this application without creative efforts fall within the protection scope of this application.

In the specification, claims, and accompanying drawings of this application, the terms, such as "first" and "second", are intended to distinguish between similar objects but do not necessarily indicate a specific order or sequence. It is to be understood that the data so used may be interchanged in an appropriate condition, so that the embodiments of this application described herein can be implemented in an order other than those illustrated or described herein. Moreover, the terms "include", "have" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device.

Before the technical solutions of this application are introduced, knowledge related to this application is first introduced below.

The so-called point cloud refers to a set of discrete points in space that are irregularly distributed and that express the spatial structure and surface properties of a 3D object or a 3D scene. Point cloud data is a specific recording form of the point cloud. Point cloud data of each point in the point cloud can include geometric information (that is, 3D location information) and property information. The geometric information of each point in the point cloud refers to Cartesian 3D coordinate data of the point. The property information of each point in the point cloud may include, but is not limited to, at least one of the following: color information, material information, or laser reflection intensity information. Usually, all points in the point cloud have a same amount of property information. For example, each point in the point cloud has two types of property information: the color information and the laser reflection intensity information.

Alternatively, each point in the point cloud has three types of property information: the color information, the material information, and the laser reflection intensity information.

With the progress and development of science and technology, at present, a large amount of highly accurate point cloud data can be obtained at lower costs and in a shorter time period. The access to the point cloud data can include, but is not limited to, at least one of the following: (1) Generate point cloud data by a computer device. The computer device can generate point cloud data based on a virtual 3D object and a virtual 3D scene. (2) Obtain point cloud data through 3D laser scanning. Through 3D laser scanning, point cloud data of a static real-world 3D object or a 3D scene can be obtained, and millions of pieces of point cloud data can be obtained per second. (3) Obtain point cloud data through 3D photogrammetry. Point cloud data of real-world visual scenes can be obtained through a 3D photography device (that is, a set of cameras or a camera device with a plurality of lenses and sensors) by capturing the real-world visual scenes, and point cloud data of dynamic real-world 3D objects or 3D scenes can be obtained through 3D photography. (4) Obtain point cloud data of biological tissues and organs by medical devices. In the medical field, point cloud data of biological tissues and organs can be obtained by medical devices such as magnetic resonance imaging (MRI), computed tomography (CT), and electromagnetic positioning information.

The so-called point cloud media refers to a point cloud media file formed by point cloud data. The point cloud media includes a plurality of media frames, and each media frame in the point cloud media is formed by point cloud data. The point cloud media can flexibly and conveniently express the spatial structure and surface properties of 3D objects or 3D scenes, and therefore, is widely used in projects such as virtual reality (VR) games, Computer Aided Design (CAD), geographic information system (GIS), Autonomous Navigation System (ANS), digital cultural heritage, free viewpoint broadcasting, 3D immersive telepresence, and 3D reconstruction of biological tissues and organs.

The so-called non-sequential point cloud media is for the same static object. That is, the point cloud media corresponding to the same static object is non-sequential.

Based on the foregoing description, reference may be made to FIG. 1. FIG. 1 is a schematic architectural diagram of a system 10 for processing non-sequential point cloud media according to an exemplary embodiment of this application. The system 10 for processing non-sequential point cloud media includes a video playback device 101 and a video production device 102. The video production device is a computer device used by a provider of the non-sequential point cloud media (for example, a content producer of the non-sequential point cloud media). The computer device may be a terminal (such as a personal computer (PC) or a smart mobile device (for example, a smartphone)), a server, or the like. The video playback device is a computer device used by a user (for example, a customer) of the non-sequential point cloud media. The computer device may be a terminal (for example, a PC), a smart mobile device (for example, a smartphone), a VR device (such as a VR headset and VR glasses), or the like. The video production device and the video playback device may be directly or indirectly connected in a wired or wireless communication manner, which is not limited in the embodiments of this application.

Figure 2A:
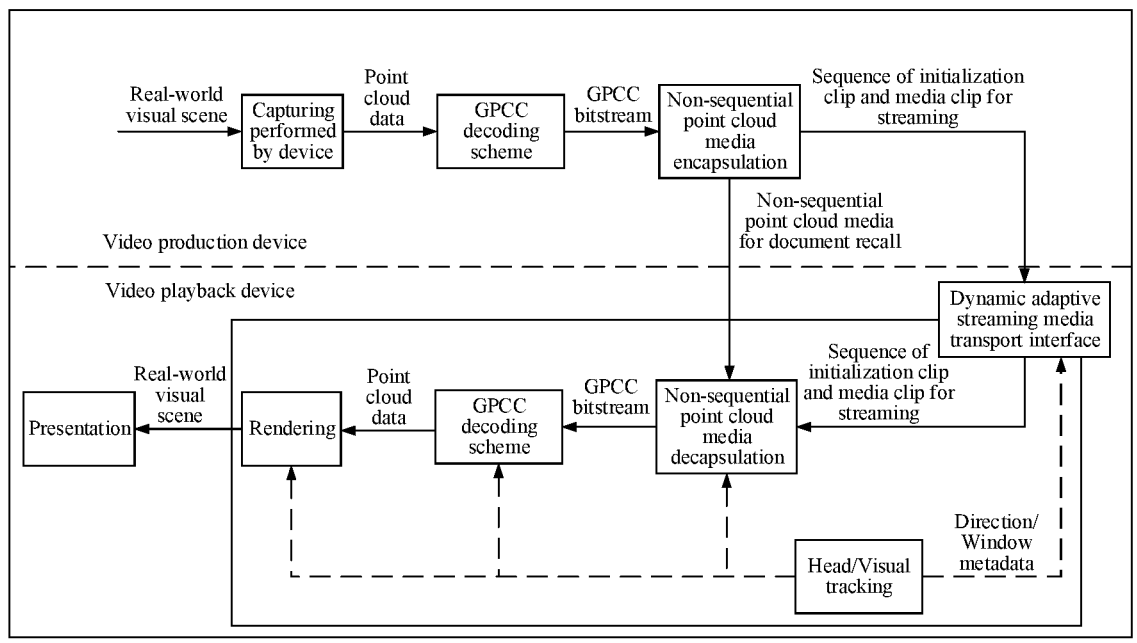
FIG. 2A is a schematic architectural diagram of a structure for processing non-sequential point cloud media according to an exemplary embodiment of this application.

FIG. 2A is a schematic architectural diagram of a structure for processing non-sequential point cloud media according to an exemplary embodiment of this application. A solution for processing non-sequential point cloud media provided in the embodiments of this application is described below with reference to the system for processing non-sequential point cloud media shown in FIG. 1 and the structure for processing non-sequential point cloud media shown in FIG. 2A. A procedure of processing non-sequential point cloud media includes a processing procedure on a video production device side and a processing procedure on a video playback device side. The specific processing procedures are as follows:

I. Processing Procedure on the Video Production Device Side:

(1) Procedure of Obtaining Point Cloud Data

In an implementation, in terms of a manner of obtaining point cloud data, the manner of obtaining point cloud data can be divided into two manners: obtaining point cloud data by capturing real-world visual scenes with a capturing device, and generating point cloud data by a computer device. In an implementation, the capturing device may be a hardware component configured in the video production device. For example, the capturing device is a camera, a sensor, or the like of a terminal. The capturing device may also be a hardware apparatus connected to a content production device, for example, a camera connected to a server. The capturing device is configured to provide a point cloud data obtaining service to the video production device. The capturing device may include, but is not limited to, any one of the following: a camera device, a sensing device, or a scanning device. The camera device may include an ordinary camera, a stereo camera, a light field camera, and the like. The sensing device may include a laser device, a radar device, and the like; the scanning device may include a 3D laser scanning device and the like. There may be a plurality of capturing devices. The capturing devices are deployed at specific locations in the real-world space to capture point cloud data from different angles in the space. The captured point cloud data is synchronized in both time and space. In another implementation, the computer device may generate point cloud data according to a virtual 3D object and a virtual 3D scene. Since manners of obtaining point cloud data are different, compression coding schemes corresponding to the point cloud data obtained in different manners may also be different.

(2) Procedure of Encoding and Encapsulating Point Cloud Data

In an implementation, the video production device encodes the obtained point cloud data using a Geometry-based Point Cloud Compression (GPCC) coding scheme or a Video-based Point Cloud Compression (VPCC) coding scheme, to obtain a GPCC bitstream or a VPCC bitstream of the point cloud data.

Figure 2B:
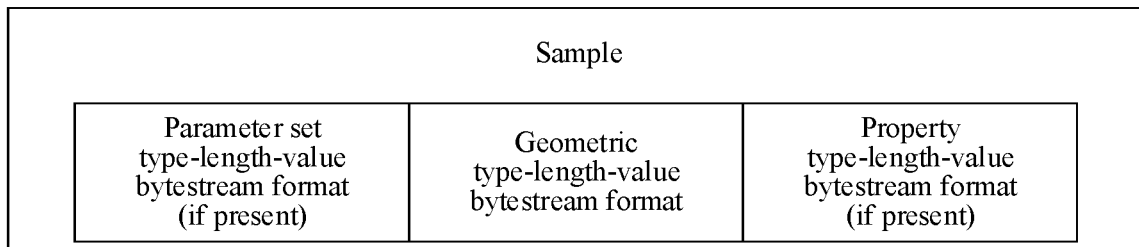
FIG. 2B is a schematic structural diagram of a sample according to an exemplary embodiment of this application.

In an implementation, using the GPCC coding scheme as an example, the video production device encapsulates the GPCC bitstream of the encoded point cloud data using a file track. The so-called file track is an encapsulation container for the GPCC bitstream of the encoded point cloud data. The GPCC bitstream may be encapsulated in a single file track, or the GPCC bitstream may be encapsulated in a plurality of file tracks. Details of encapsulating the GPCC bitstream in a single file track and encapsulating the GPCC bitstream in a plurality of file tracks are as follows:

1. The GPCC bitstream is encapsulated in a single file track. When the GPCC bitstream is transported in the single file track, the GPCC bitstream is required to be declared and represented according to transport rules of the single file track. The GPCC bitstream encapsulated in the single file track needs no further processing, and can be encapsulated in the International Organization for Standardization Base Media File Format (ISOBMFF). Specifically, each sample encapsulated in the single file track includes one or more GPCC components. The GPCC component may be a GPCC geometric component or a GPCC property component. The so-called sample is a set of one or more point cloud encapsulation structures. That is to say, each sample includes one or more type-length-value bitstream format (TLV) encapsulation structures. FIG. 2B is a schematic structural diagram of a sample according to an exemplary embodiment of this application. As shown in FIG. 2B, when being transported in a single file track, a sample in the file track includes a GPCC parameter set TLV, a geometric bitstream TLV, and a property bitstream TLV, and the sample is encapsulated in the single file track.

Figure 2C:
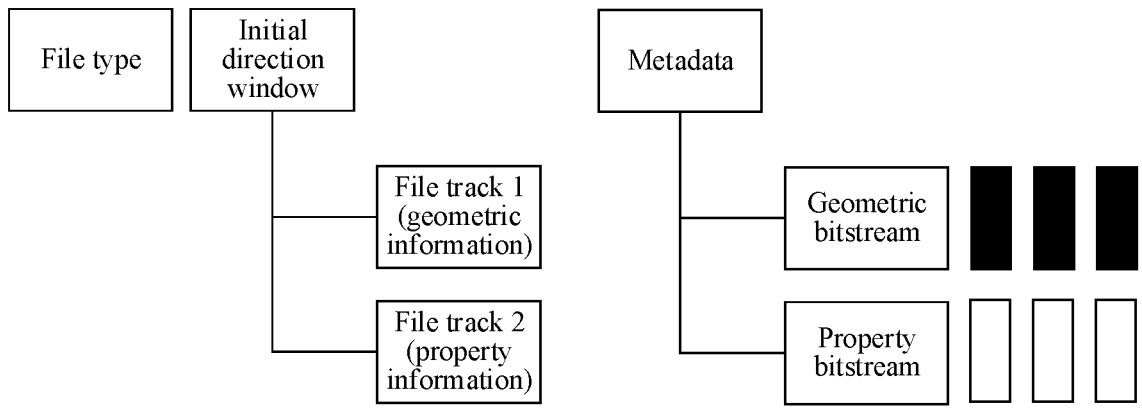
FIG. 2C is a schematic structural diagram of a container including a plurality of file tracks according to an exemplary embodiment of this application.
Figure 2D:
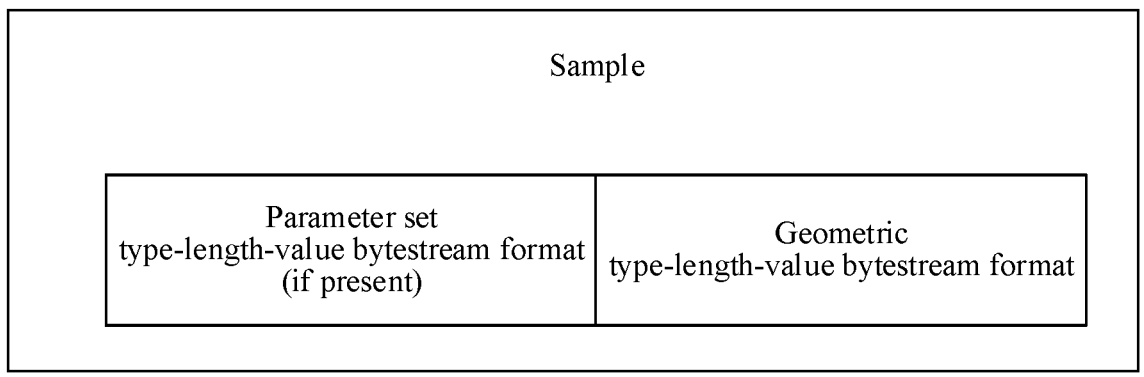
FIG. 2D is a schematic structural diagram of a sample according to another exemplary embodiment of this application.

2. The GPCC bitstream is encapsulated in a plurality of file tracks. When the encoded GPCC geometric bitstream and the encoded GPCC property bitstream are transported in different file tracks, each sample in the file tracks includes at least one TLV encapsulation structure. The TLV encapsulation structure carries data of a single GPCC component, and the TLV encapsulation structure does not include both the encoded GPCC geometric bitstream and the encoded GPCC property bitstream. FIG. 2C is a schematic structural diagram of a container including a plurality of file tracks according to an exemplary embodiment of this application. As shown in FIG. 2C, an encapsulated package 1 transported in a file track 1 includes the encoded GPCC geometric bitstream but does not include the encoded GPCC property bitstream, and an encapsulated package 2 transported in a file track 2 includes the encoded GPCC property bitstream but does not include the encoded GPCC geometric bitstream. Since the video playback device first decodes the encoded GPCC geometric bitstream during decoding, and decoding of the encoded GPCC property bitstream depends on decoded geometric information, encapsulating different GPCC component bitstreams in separate file tracks enables the video playback device to access the file track carrying the encoded GPCC geometric bitstream before the encoded GPCC property bitstream. FIG. 2D is a schematic structural diagram of a sample according to another exemplary embodiment of this application. As shown in FIG. 2D, when being transported in the plurality of file tracks, the encoded GPCC geometric bitstream and the encoded GPCC property bitstream are transported in the different file tracks. A sample in the file track includes the GPCC parameter set TLV and the geometric bitstream TLV. The sample does not include the property bitstream TLV. The sample is encapsulated in any one of the plurality of file tracks.

In an implementation, the obtained point cloud data forms non-sequential point cloud media after being encoded and encapsulated by the video production device. The non-sequential point cloud media may be an entire media file of the object, or may also be a media clip of the object. In addition, the video production device uses media presentation description (MPD) (that is, a description signaling file) to record metadata of encapsulated file of the non-sequential point cloud media according to file format requirements of the non-sequential point cloud media. The metadata is a general term for information related to presentation of the non-sequential point cloud media, and the metadata may include description information of the non-sequential point cloud media, description information of a window, signaling information related to the presentation of the non-sequential point cloud media, and the like. The video production device delivers the MPD to the video playback device to enable the video playback device to request the point cloud media according to the relevant description information in the MPD. Specifically, the point cloud media and the MPD are delivered to the video playback device by the video production device using the transport mechanism (such as Dynamic Adaptive Streaming over HTTP (DASH) and Smart Media Transport (SMT)).

II. Data Processing Procedure on the Video Playback Device Side:

(1) Procedure of Decapsulating and Decoding Point Cloud Data

In an implementation, the video playback device can obtain the non-sequential point cloud media through MPD signaling transmitted by the video production device. A file decapsulation procedure on the video playback device side is inverse to a file encapsulation procedure on the video production device side. The video playback device decapsulates the encapsulated file of the non-sequential point cloud media according to the file format requirements of the non-sequential point cloud media and obtains an encoded bitstream (that is, the GPCC bitstream or the VPCC bitstream). A decoding procedure on the video playback device side is inverse to an encoding procedure on the video production device side. The video playback device decodes the encoded bitstream to restore the point cloud data.

(2) Procedure of Rendering Point Cloud Data

In an implementation, the video playback device renders, according to the metadata related to rendering and the window in the MPD, the point cloud data obtained by decoding the GPCC bitstream, and presents the visual scenes corresponding to the point cloud data after the rendering is completed.

It is to be understood that the system for processing non-sequential point cloud media described in the embodiments of this application aims to more clearly describe the technical solutions in the embodiments of this application, but is not intended to limit the technical solutions provided in the embodiments of this application. A person of ordinary skill in the art may appreciate that, as a system architecture evolves and a new business scenario emerges, the technical solutions provided in the embodiments of this application are also applicable to similar technical problems.

As stated above, the point cloud data for a same object may be encapsulated into different point cloud media. For example, some pieces of point cloud media are entire point cloud media of the object, and some pieces of point cloud media are partial point cloud media of the object. Based on this, the user can request to play different point cloud media. However, the user does not know whether the different point cloud media are point cloud media of the same object during requesting, resulting in the problem of blind requests. This problem also exists for the non-sequential point cloud media of the static object.

To resolve the foregoing technical problems, in this application, an identifier of the static object is carried in the non-sequential point cloud media, so that the user can purposefully request the non-sequential point cloud media of the same static object a plurality of times.

Figure 3:
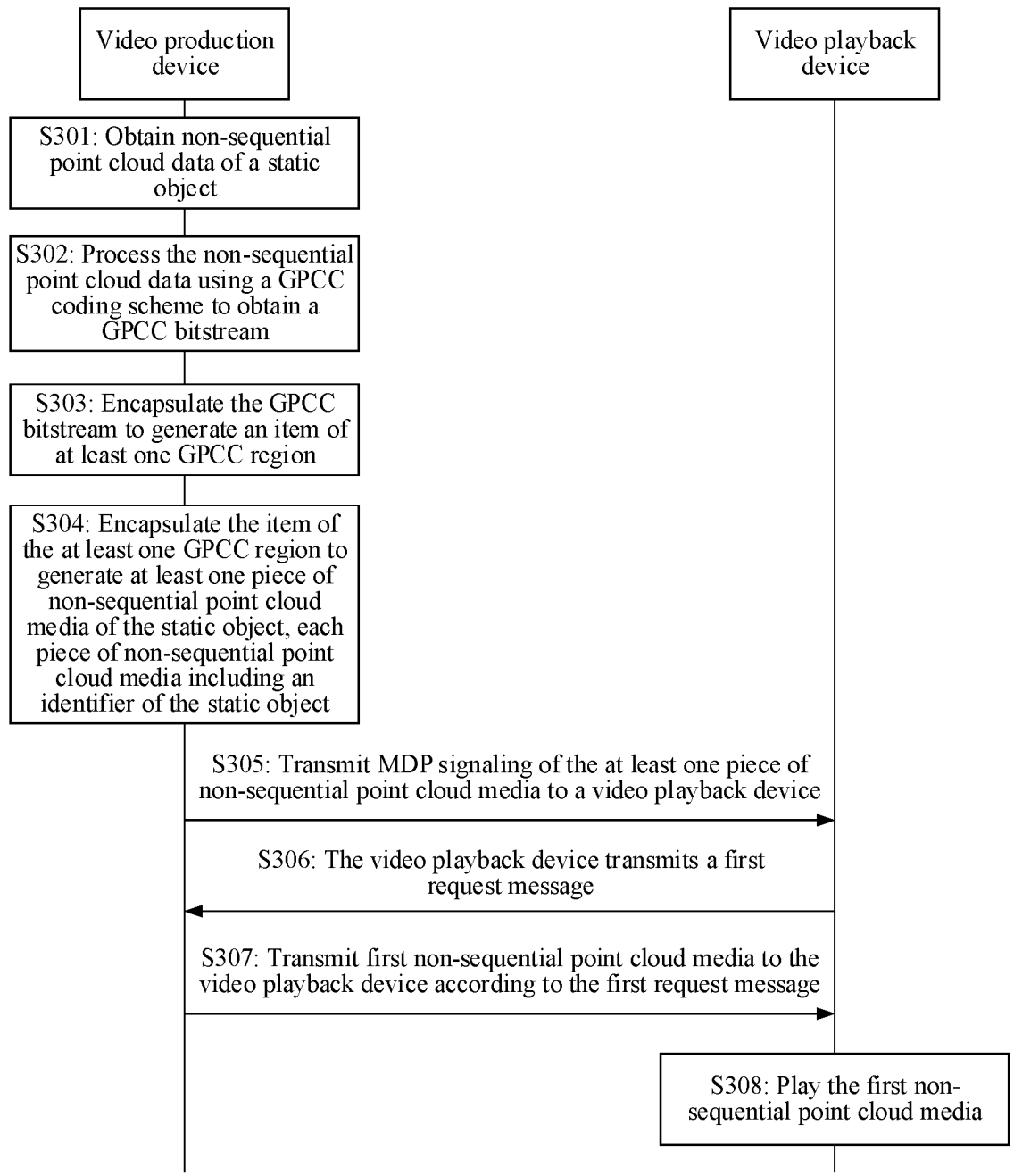
FIG. 3 is an interaction flowchart of a method for processing non-sequential point cloud media according to an embodiment of this application.

The technical solutions of this application are described below in detail:

FIG. 3 is an interaction flowchart of a method for processing non-sequential point cloud media according to an embodiment of this application. The method is performed by a video production device and a video playback device. As shown in FIG. 3, the method includes the following steps:

S301: The video production device obtains non-sequential point cloud data of a static object.

S302: The video production device processes the non-sequential point cloud data using a GPCC coding scheme to obtain a GPCC bitstream.

S303: The video production device encapsulates the GPCC bitstream to generate an item of at least one GPCC region.

S304: The video production device encapsulates the item of the at least one GPCC region to generate at least one piece of non-sequential point cloud media of the static object, each piece of non-sequential point cloud media including an identifier of the static object.

S305: The video production device transmits MPD signaling of the at least one piece of non-sequential point cloud media to the video playback device.

S306: The video playback device transmits a first request message.

The first request message is transmitted by the video playback device according to the MPD signaling, the first request message being used to request first non-sequential point cloud media in the at least one piece of non-sequential point cloud media.

S307: The video production device transmits the first non-sequential point cloud media to the video playback device according to the first request message.

S308: The video playback device plays the first non-sequential point cloud media.

It is to be understood that for how to obtain the non-sequential point cloud data of the static object and the GPCC bitstream, reference may be made to the foregoing related knowledge, and details are not described in this application again.

For an item of any GPCC region in the item of the at least one GPCC region, the item of the GPCC region is used to represent a GPCC component of a 3D spatial region corresponding to the GPCC region.

Each GPCC region corresponds to one 3D spatial region of the static object. The 3D spatial region may be an entire or partial 3D spatial region of the static object.

As stated above, a GPCC component may be a GPCC geometric component or a GPCC property component.

It is to be understood that, the identifier of the static object can be defined by the following code on the video production device side:

aligned(8) class ObjectInfoProperty extends ItemProperty ('obif') {unsigned int(32) object_ID;}

ObjectInfoProperty indicates the property of content corresponding to the item. The property can be included in both the GPCC geometric component and the property component. When only the GPCC geometry component includes the property, the ObjectInfoProperty fields of all property components associated with the GPCC geometry component are the same as it.

object_ID indicates the identifier of the static object. Items of different GPCC regions of the same static object have the same object_ID.

In some embodiments, the identifier of the static object may be carried in the item related to the GPCC geometric component of the point cloud media, or be carried in an item related to the GPCC property component of the point cloud media, or be carried in an item related to the GPCC geometric component and an item related to the GPCC property component in the point cloud media, which is not limited in this application.

Figure 4A:
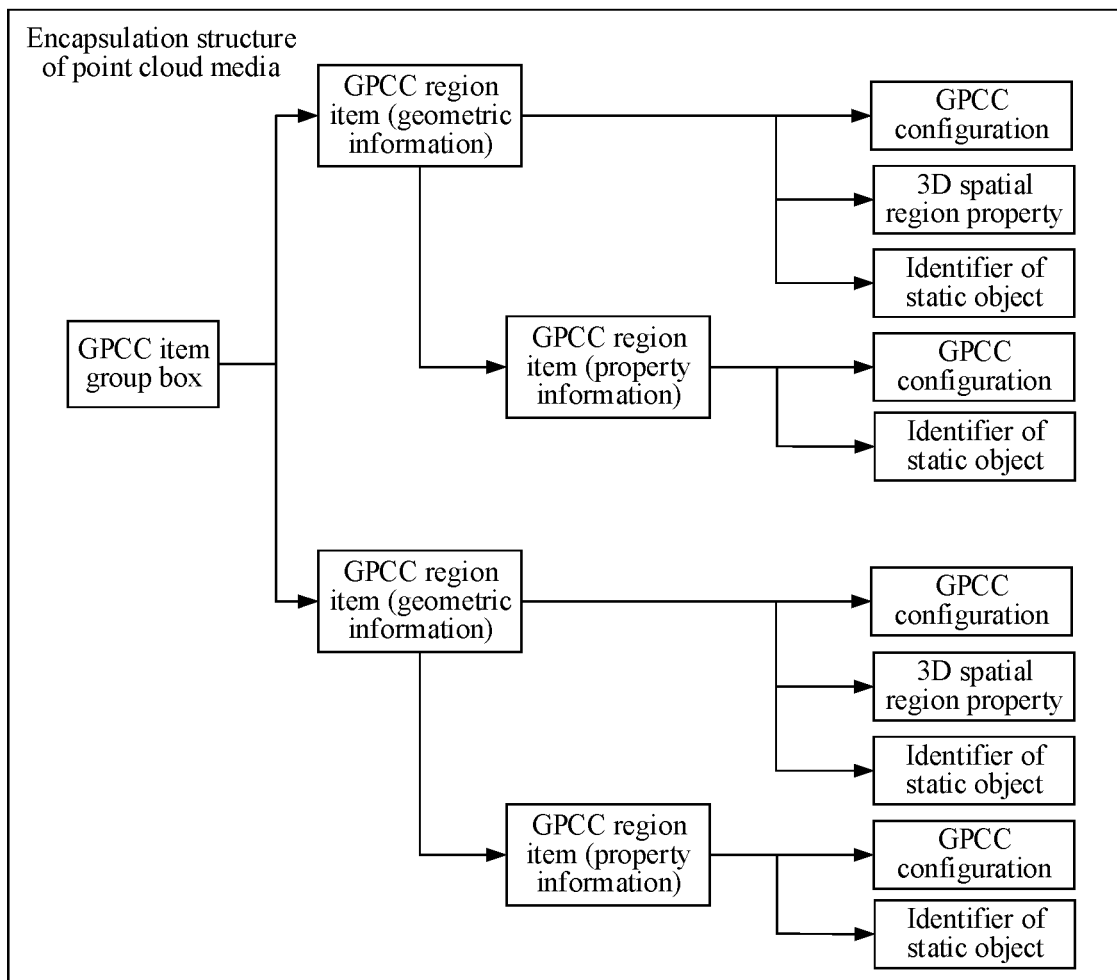
FIG. 4A is a schematic diagram of encapsulation of point cloud media according to an embodiment of this application.

Exemplarily, FIG. 4A is a schematic diagram of encapsulation of point cloud media according to an embodiment of this application. As shown in FIG. 4A, the point cloud media includes an item related to the GPCC geometric component and an item related to the GPCC property component. The items may be associated by using a GPCC item group in the point cloud media. As shown in FIG. 4A, the item related to the GPCC geometric component is associated with the item related to the GPCC property component. The item related to the GPCC geometric component may include the following item properties: for example, GPCC configuration, a 3D spatial region property (or ItemSpatialInfoProperty), and the identifier of the static object. The item related to the GPCC property component can include the following item properties: for example, GPCC configuration and the identifier of the static object.

In some embodiments, the GPCC configuration indicates configuration information of a decoder required to decode the corresponding item and the information related to each GPCC component, but is not limited thereto.

The item related to the GPCC property component may further include: a 3D spatial region property, which is not limited in this application.

Figure 4B:
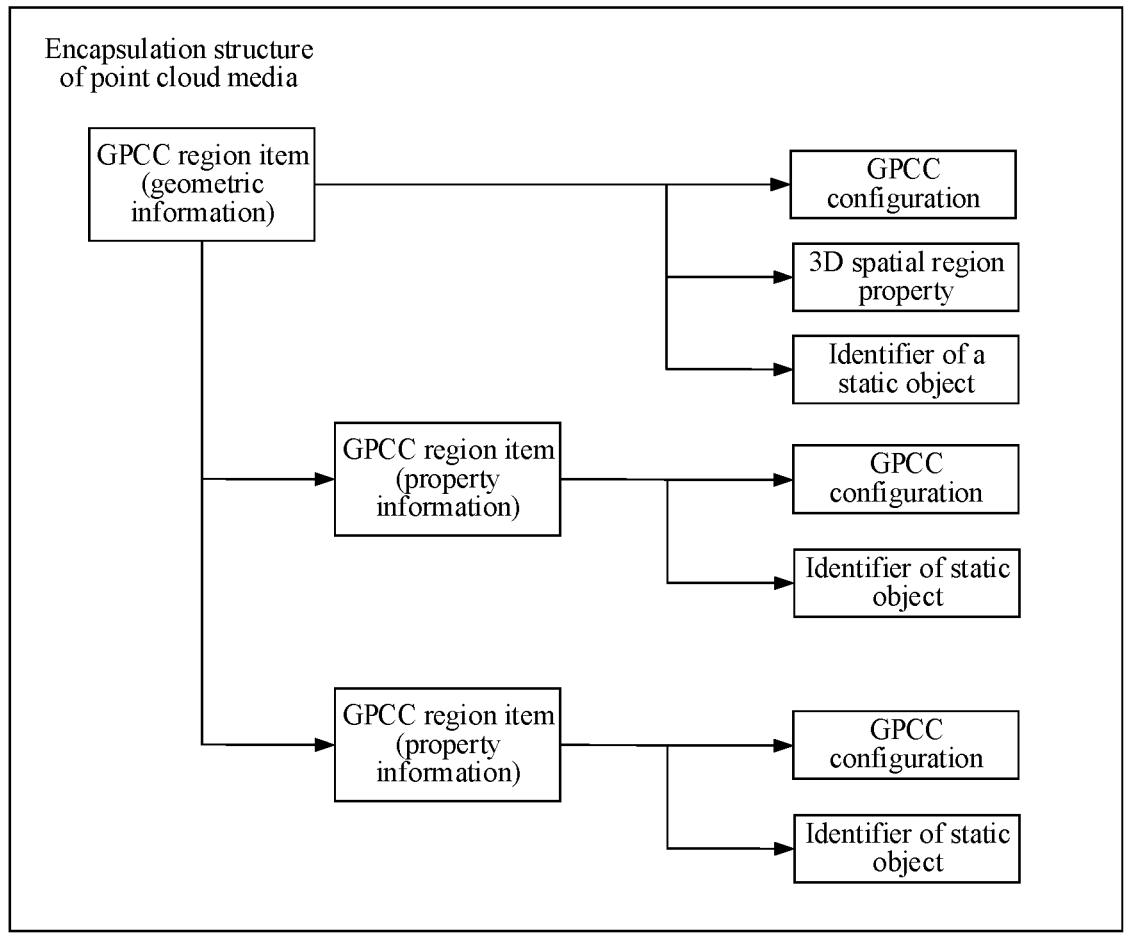
FIG. 4B is another schematic diagram of encapsulation of point cloud media according to an embodiment of this application.

Exemplarily, FIG. 4B is another schematic diagram of encapsulation of point cloud media according to an embodiment of this application. FIG. 4B differs from FIG. 4A in that in FIG. 4B, the point cloud media includes an item related to the GPCC geometric component, and the item is associated with two items related to the GPCC property component. For the remaining properties included in the item related to the GPCC geometric component and the remaining properties included in the item related to the GPCC property component, reference may be made to FIG. 4A, and details are not described in this application again.

It is to be understood that, the identifier of the static object is not limited to being carried in a property correspondingly included in an item of each GPCC region.

It is to be understood that, for the MPD signaling, reference may be made to the related knowledge in this application, and details are not described in this application again.

In some embodiments, for any piece of non-sequential point cloud media in the at least one piece of non-sequential point cloud media, the non-sequential point cloud media may be entire or partial point cloud media of the static object.

It is to be understood that, the video playback device can transmit the first request message according to the MPD signaling, to request the first non-sequential point cloud media.

In summary, in this application, the video production device, when encapsulating the non-sequential point cloud media, may add the identifier of the static object to the non-sequential point cloud media, so that the user can purposefully request non-sequential point cloud media of a same static object a plurality of times, thereby improving the user experience.

In the related art, an item of each GPCC region corresponds to only one 3D spatial region. However, in this application, the 3D spatial region can be further divided. Based on this, in this application, the item property of the non-sequential point cloud media and the MPD signaling are correspondingly updated, and details are as follows:

In some embodiments, an item of a target GPCC region includes: an item property of the 3D spatial region, the item property of the 3D spatial region including: a first identifier and a second identifier. The target GPCC region is a GPCC region in at least one GPCC region. The first identifier (Sub_region_contained) is used to identify whether the target 3D spatial region corresponding to the target GPCC region is divided into a plurality of spatial sub-regions. The second identifier (tile_id_present) is used to identify whether a GPCC coding scheme is adopted for the target GPCC region.

Exemplarily, when Sub_region_contained=0, it indicates that the target 3D spatial region corresponding to the target GPCC region is not divided into a plurality of spatial sub-regions, and when Sub_region_contained=1, it indicates that the target 3D spatial region corresponding to the target GPCC region is divided into a plurality of spatial sub-regions.

Exemplarily, when tile_id_present=0, it indicates that the GPCC tile coding scheme is not adopted for the target GPCC region, and when tile_id_present=1, it indicates that the GPCC tile coding scheme is adopted for the target GPCC region.

It is to be understood that, when Sub_region_contained=1, tile_id_present=1. That is, when the target 3D spatial region corresponding to the target GPCC region is divided into a plurality of spatial sub-regions, the GPCC tile coding scheme needs to be adopted on the video production side.

In some embodiments, when the target 3D spatial region corresponding to the target GPCC region is divided into a plurality of spatial sub-regions, the item property of the 3D spatial region further includes, but is not limited to: information about the plurality of spatial sub-regions and information about the target 3D spatial region.

In some embodiments, for any spatial sub-region in the plurality of spatial sub-regions, the information about the spatial sub-region includes at least one of the following, but is not limited to: an identifier of the spatial sub-region, location information of the spatial sub-region, or a tile identifier of the spatial sub-region when the GPCC tile coding scheme is adopted for the target GPCC region.

In some embodiments, the location information of the spatial sub-region includes, but is not limited to, location information of an anchor point of the spatial sub-region and lengths of the spatial sub-region along the X axis, the Y axis, and the Z axis. Alternatively, the location information of the spatial sub-region includes, but is not limited to: location information of two anchor points of the spatial sub-region.

In some embodiments, the information about the target 3D spatial region includes at least one of the following, but is not limited to: an identifier of the target 3D spatial region, location information of the target 3D spatial region, or a quantity of spatial sub-regions included in the target 3D spatial region.

In some embodiments, the location information of the target 3D spatial region includes, but is not limited to: location information of an anchor point of the target 3D spatial region and lengths of the target 3D spatial region along the X axis, the Y axis, and the Z axis. Alternatively, the location information of the target 3D spatial region includes, but is not limited to: location information of two anchor points of the target 3D spatial region.

In some embodiments, when the target 3D spatial region corresponding to the target GPCC region is divided into a plurality of spatial sub-regions, the item property of the 3D spatial region further includes a third identifier (initial_region_id). When a value of the third identifier is a first value or null, indicating that the item corresponding to the target GPCC region is an item initially presented by the video playback device, for the target 3D spatial region and the spatial sub-regions of the target 3D spatial region, the video playback device initially presents the target 3D spatial region. When the value of the third identifier is a second value, indicating that the item corresponding to the target GPCC region is the item initially presented by the video playback device, for the target 3D spatial region and the spatial sub-regions of the target 3D spatial region, the video playback device initially presents a spatial sub-region corresponding to the second value in the target 3D spatial region.

In some embodiments, the first value is 0, and the second value is an identifier of the spatial sub-region that needs to be presented in the target 3D spatial region.

In some embodiments, when the target 3D spatial region corresponding to the target GPCC region is not divided into a plurality of spatial sub-regions, the item property of the 3D spatial region further includes: information about the target 3D spatial region. In some embodiments, the information about the target 3D spatial region includes at least one of the following, but is not limited to: an identifier of the target 3D spatial region, location information of the target 3D spatial region, the tile identifier of the target 3D spatial region when the GPCC tile coding scheme is adopted for the target GPCC region.

It is to be understood that, for the location information of the target 3D spatial region, reference may be made to the foregoing explanation about the location information of the target 3D spatial region, and details are not described in this application again.

The updating of the item property of the non-sequential point cloud media in this application is described below in the form of code:

```
aligned(8) class ItemSpatialInfoProperty extends ItemProperty('gpis')
   unsigned int(l) sub_region_contained;
   unsigned int(l) tile_id_present;
   bit(6) reserved;
   3DSpatialRegionStruct(l);
   unsigned int(16) inital_region_id;
   if(sub_region_contained == 1){
      unsigned int(8) num_sub_regions;
      for(inti=0; i<num_sub_regions; i++){
         3DSpatialRegionStruct(l)
         unsigned int(8) num_tiles;
         for(int j =0; j <num_til es; j++)
            unsigned int(16) tile id;
      }
   }
   else{
      if(tile_id_present == 1){
         unsigned int(8) numtiles;
         for(int j =0; j <num_til es; j++)
            unsigned int(16) tile id;
      }
   }
}
aligned(8) class 3DSpatialRegionStruct(dimension_included)
}
   unsigned int(16) 3d_region_id;
   unsinged int(16) anchor_ x;
   unsinged int(16) anchor_y;
   unsinged int(16) anchor_z;
if (dimension_included)
{
   unsinged int(16) region_dx;
      unsinged int(16) region_dy;
      unsinged int(16) region_dz;
}
```

Meanings of the fields are as follows:
ItemSpatialInfoProperty indicates a 3D spatial region property of the item of the GPCC region. When the item is an item corresponding to a geometric component, the property is to be included. When the item is an item corresponding to a property component, the 3D spatial region property may not be included.

When a value of sub_region_contained is set to 1, it indicates that the 3D spatial region may be further divided into a plurality of spatial sub-regions. When the value of the field is 1, a value of tile_id_present is to be set to 1. When the value of sub_region_contained is set to 0, it indicates that the 3D spatial region is not further divided into spatial sub-regions.

When the value of tile_id_present is set to 1, it indicates that the GPCC tile coding scheme is adopted for the non-sequential point cloud data, and a tile ID corresponding to the non-sequential point cloud is given in this property.

inital_region_id indicates an ID of a spatial region initially presented inside an overall space of a current item when the current item is an item initially consumed or played. When a value of the field is set to 0 or the field does not exist, the region initially presented by the item is the overall 3D spatial region. When the value of the field is an identifier of a spatial sub-region, the region initially presented by the item is the spatial sub-region corresponding to the identifier.

3DSpatialRegionStruct represents the 3D spatial region, the first 3DSpatialRegionStruct field in ItemSpatialInfoProperty indicates a 3D spatial region corresponding to an item corresponding to ItemSpatialInfoProperty, and the remaining 3DSpatialRegionStruct fields indicate spatial sub-regions in the 3D spatial region corresponding to the item.

num_sub_regions indicates the number of spatial sub-region divided in the 3D spatial region corresponding to the item.

num_tiles indicates a quantity of tiles in the 3D spatial region corresponding to the item, or a quantity of tiles corresponding to the spatial sub-regions of the item.

tile_id indicates an identifier of a GPCC tile.

anchor_x, anchor_y, and anchor z represent the x, y, and z coordinates of an anchor point of the 3D spatial region or a spatial sub-region of the region respectively.

region_dx, region_dy, and region_dz represent lengths of the 3D spatial region or a spatial sub-region of the region along the X axis, the Y axis, and the Z axis.

In summary, in this application, the 3D spatial region may be divided into a plurality of spatial sub-regions, which, in combination with the characteristic of independent coding and decoding of GPCC tiles, enables the user decode and present the non-sequential point cloud media with higher efficiency and lower latency.

As stated above, the video production device can encapsulate the item of the at least one GPCC region to generate at least one piece of non-sequential point cloud media of the static object; encapsulate, when a quantity of items of the at least one GPCC region is one, an item of one GPCC region into one piece of non-sequential point cloud media; and encapsulate, when a quantity of items of the at least one GPCC region is N, items of N GPCC regions into M pieces of non-sequential point cloud media. N is an integer greater than 1, a value range of M is [1, N], and M is an integer. For example, when a quantity of items of the at least one GPCC region is N, items of N GPCC regions may be encapsulated into one piece of non-sequential point cloud media, where in such a case of encapsulation, one piece of non-sequential point cloud media includes N items, or may be encapsulated into N pieces of non-sequential point cloud media, where in such a case of encapsulation, each piece of non-sequential point cloud media includes one item.

Fields in second non-sequential point cloud media are described below. The second non-sequential point cloud media is any piece of non-sequential point cloud media including items of a plurality of GPCC regions in the at least one piece of non-sequential point cloud media.

In some embodiments, the second non-sequential point cloud media includes:

a GPCC item group box (GPCCItemGroupBox). The GPCC item group box is used to associate the items of the plurality of GPCC regions, as shown in FIG. 4A and FIG. 4B.

In some embodiments, the GPCC item group box includes: identifiers of the items of the plurality of GPCC regions.

In some embodiments, the GPCC item group box includes a fourth identifier (initial_item_ID). The fourth identifier is an identifier of an item initially presented by the video playback device in the items of the plurality of GPCC regions.

In some embodiments, the GPCC item group box includes a fifth identifier (partial_item_flag). When a value of the fifth identifier is a third value, the items of the plurality of GPCC regions constitute a complete GPCC frame of the static object. When the value of the fifth identifier is a fourth value, the items of the plurality of GPCC regions constitute a partial GPCC frame of the static object.

In some embodiments, the third value may be 0, and the fourth value may be 1, which, however, are not limited thereto.

In some embodiments, the GPCC item group box includes: location information of a GPCC region constituted by the plurality of GPCC regions.

Exemplarily, when the plurality of GPCC regions are two regions R1 and R2, the GPCC item group box includes location information of a region R1+R2.

Fields in the foregoing GPCC item group box are described below using code:

```
aligned(8) class GPCCItemGroupBox
    extends EntityToGroupBox('gcig') {
    unsigned int(16) initial_item_ID;
    unsigned int(1) partial item flag;
    bit(7) reserved;
    if(partial_item_flag == 1){
        3DSpatialRegionStruct(1);
    }
}
```

Items included in GPCCItemGroupBox are items belonging to a same static object, and are times having an association relationship during presentation consumption. All the items included in GPCCItemGroupBox may constitute a complete GPCC frame or may be a part of a GPCC frame.

initial_item_ID indicates an identifier of an initially consumed item in an item group.

initial_item_ID is only valid when a current item group is an item group requested by the user for the first time. For example, the same static object corresponds to two pieces of point cloud media, F1 and F2. When the user requests F1 for the first time, initial_item_ID in an item group in F1 is valid, and for F2 requested for the second time, initial_item_ID in F2 is invalid.

When a value of partial_item_flag is set to 0, all items included in GPCCItemGroupBox and their associated items constitute a complete GPCC frame. When the value is set to 1, all the items included in GPCCItemGroupBox and their associated items only constitute a partial GPCC frame.

To support the technology provided in this application, a corresponding signaling message also needs to be extended. Using MPD signaling as an example, the extension is as follows:

A GPCC item descriptor is used to describe an element and a property related to a GPCC item, and the descriptor is a SupplementalProperty element.

Its @schemeIdUri property is equal to "urn:mpeg:mpegL:gpcc:2020:gpsr". The descriptor may be located at the adaptation set level or the representation level.

Representation: a combination of one or more media components in DASH. For example, a video file of a specific resolution may be considered as a Representation (description).

Adaptation set: a set of one or more video streams in DASH. One Adaptation set may include a plurality of representations.

TABLE 1

Element and property of GPCC item descriptor

| Element and property of GPCC item descriptor | Specification | Data type | Description |
|---|---|---|---|
| gpim | 0 . . . 1 | gpcc: item | Container element, a property of which specifies a property of a GPCC item. |
| gpim@objectId | M | unsigned int | Object identifier property, indicating an object identifier of a GPCC item. |
| gpim.spatialRegion | 0 . . . 1 | gpcc: spatialRegionType | A property of this element defines a 3D spatial region corresponding to a GPCC item. |
| gpsr.spatialRegion@id | M | xs: unsignedShort | Identifier of an 3D spatial region, where a value of the field is to be same as a value of the 3d_region_id field in a corresponding ISOBMFF data box. |
| gpim.spatialRegion@x | OD | xs: int | x coordinate of an anchor point of a spatial region. When the field does not exist, a default value of the field is 0. |
| gpim.spatialRegion@y | OD | xs: int | y coordinate of an anchor point of a spatial region. When the field does not exist, a default value of the field is 0. |
| gpim.spatialRegion@z | OD | xs: int | z coordinate of an anchor point of a spatial region. When the field does not exist, a default value of the field is 0. |
| gpim.spatialRegion@dx | M | xs: int | Length of a spatial region along the x axis (that is, the width). When a value of the field is negative, it means a length along the negative x axis. |
| gpim.spatialRegion@dy | M | xs: int | Length of a spatial region along the y axis (that is, the height). When a value of the field is negative, it means a length along the negative y axis. |
| gpim.spatialRegion@dz | M | xs: int | Length of a spatial region along the z axis (that is, the depth). When a value of the field is negative, it means a length along the negative z axis. |

TABLE 1-continued

Element and property of GPCC item descriptor

| Element and property of GPCC item descriptor | Specification | Data type | Description |
|---|---|---|---|
| gpim@tileIdFlag | 0 | bit(1) | Indicating whether the property of the GPCC item includes tile ID information. |
| gpim@subRegionFlag | 0 | bit(1) | Indicating whether the property of the GPCC item includes spatial sub-region information. When a value of the field is set to 1, a value of tileIdFlag is to be set to 1. |
| gpim.spatialRegion@tileIds | 0 | xs: UIntVectorType | |
| gpim.subSpatialRegion | 0 . . . M | gpcc: spatialRegionType | The property of the element defines spatial sub-region information in a 3D spatial region corresponding to a GPCC item. |
| gpsr.subSpatialRegion@id | M | xs: unsignedShort | Identifier of a spatial sub-region in a 3D spatial region corresponding to a GPCC item, where a value of the field is to be same as a value of the 3d_region_id field in a corresponding ISOBMFF data box. |
| gpim.subSpatialRegion@x | OD | xs: int | x coordinate of an anchor point of a spatial sub-region. When a value of his field is a GPCC tile ID list, it represents a tile corresponding to a current spatial sub-region. When the field does not exist, a default value of the field is 0. |
| gpim.subSpatialRegion | OD | xs: int | y coordinate of an anchor point of a spatial sub-region. When the field does not exist, a default value of the field is 0. |
| gpim.subSpatialRegion@z | OD | xs: int | z coordinate of an anchor point of a spatial sub-region. When the field does not exist, a default value of the field is 0. |
| gpim.subSpatialRegion@dx | OD | xs: int | Length of a spatial sub-region along the x axis (that is, the width). When a value of the field is negative, it means a length along the negative x axis. |
| gpim.subSpatialRegion@dy | OD | xs: int | Length of a spatial region along the y axis (that is, the height). When a value of the field is negative, it means a length along the negative y axis. |
| gpim.subSpatialRegion@dz | OD | xs: int | Length of a spatial region along the z axis (that is, the depth). When a value of the field is negative, it means a length along the negative z axis. |

TABLE 1-continued

Element and property of GPCC item descriptor

| Element and property of GPCC item descriptor | Specification | Data type | Description |
|---|---|---|---|
| gpim.subSpatialRegion@tileIds | OD | xs: UIntVectorType | GPCC tile ID list, representing a tile corresponding to a current spatial sub-region. |

In summary, in this application, the video production device can flexibly combine items of the plurality of GPCC regions to form different non-sequential point cloud media. The non-sequential point cloud media may constitute a complete GPCC frame or a partial GPCC frame, thereby improving the flexibility of video production. Further, when one piece of non-sequential point cloud media includes items of a plurality of GPCC regions, the video production device can further improve the item initially presented.

The embodiment corresponding to FIG. 3 is exemplified below using the following embodiments:

It is assumed that the video production device obtains non-sequential point cloud data of a specific static object, and the non-sequential point cloud data has 4 versions of point cloud media on the video production device side: point cloud media F0 corresponding to all the non-sequential point cloud data and point cloud media F1 to F3 corresponding to parts of the non-sequential point cloud data. F1 to F3 correspond to the 3D spatial regions R1 to R3 respectively. Based on this, content encapsulated in the point cloud media F0 to F3 is as follows:

F0: ObjectInfoProperty: object_ID=10;
ItemSpatialInfoProperty: sub_region_contained=1; tile_id_present=1 inital_region_id=1001;
R0: 3d_region_id=100, anchor=(0,0,0), region=(200,200,200) num_sub_regions=3;
SR1: 3d_region_id=1001, anchor=(0,0,0), region=(100,100,200); num_tiles=1, tile_id[ ]=(1);
SR2: 3d_region_id=1002, anchor=(100.0,0), region=(100,100,200); num_tiles=1, tile_id[ ]=(2);
SR3: 3d_region_id=1003, anchor=(0,100,0), region=(200,100,200); num_tiles=2, tile_id[ ]=(3.4);
F1: ObjectInfoProperty: object_ID=10;
ItemSpatialInfoProperty: sub_region_contained=0; tile_id_present=1; inital_region_id=0;
R1: 3d_region_id=101, anchor=(0.0,0), region=(100,100,200); num_tiles=1, tile_id[ ]=(1);
F2: ObjectInfoProperty: object_ID=10;
ItemSpatialInfoProperty: sub_region_contained=0; tile_id_present=1 inital_region_id=0;
R2: 3d_region_id=102, anchor=(100.0,0), region=(100,100,200); num_tiles=1, tile_id[ ]=(2);
F3: ObjectInfoProperty: object_ID=10;
ItemSpatialInfoProperty: sub_region_contained=0; tile_id_present=1; initial_region_id=0;
R3: 3d_region_id=103, anchor=(0,100,0), region=(200,100,200); num_tiles=2, tile_id[ ]=(3.4);

Further, the video production device transmits MPD signaling of F0 to F3 to the user. Object_ID, the spatial region, the spatial sub-region, and the tile identifier information are the same as those in file encapsulation, and details are not described herein again.

Since a user U1 has good network conditions and low data transmission latency, the user U1 may request F0. Since a user U2 has poor network conditions and high data transmission latency, the user U2 may request F1.

The video production device transmits F0 to a video playback device corresponding to the user U1, and transmits F1 to a video playback device corresponding to the user U2.

After the video playback device corresponding to the user U1 receives F0, an initial viewing region is an SR1 region and a corresponding tile ID is 1. During decoding and consumption, U1 may separately decode a tile '1' in the overall bitstream for direct consumption and presentation instead of performing presentation after decoding the entire file, which improves the decoding efficiency and reduces the time required for rendering and presentation. When U1 continues to consume and view an SR2 region, a corresponding tile ID is 2, and a part corresponding to the tile '2' in the overall bitstream is directly decoded for presentation and consumption.

After receiving F1, the video playback device corresponding to the user U2 decodes F1 for consumption, and requests, according to a region that the user may consume next, with reference to information in an MPD file, that is, Object_ID and spatial region information, F2 or F3 in advance for caching.

That is to say, after the video production device transmits the first non-sequential point cloud media to the video playback device, the video playback device may further purposefully request the video production device again for non-sequential point cloud media of the same static object based on situations such as consumption demands of the user and a possibly consumed region.

In a possible implementation, after S307 of transmitting the first non-sequential point cloud media to the video playback device according to the first request message, the method further includes:

receiving a second request message transmitted by the video playback device based on the identifier of the static object, the second request message being used to request third non-sequential point cloud media in the at least one piece of non-sequential point cloud media; and transmitting the third non-sequential point cloud media to the video playback device according to the second request message.

Since the video playback device obtains the identifier of the static object in the point cloud media through the foregoing steps, when needing to obtain other point cloud media corresponding to the static object, the video playback device can request point cloud media of the same static object a plurality of times in a targeted manner according to the identifier of the static object.

It is assumed that the video production device obtains non-sequential point cloud data of a static object, and the non-sequential point cloud data has two versions of point cloud media on the video production device side: F1 and F2. F1 includes item1 and item2, and F2 includes item3 and item4.

Content encapsulated in the point cloud media F1 and F2 is as follows:

F1:
  item1: ObjectInfoProperty: object_ID=10; item_ID=101
    ItemSpatialInfoProperty: sub_region_contained=0; tile_id_present=1 inital_region_id=0;
  R1: 3d_region_id=1001, anchor=(0.0,0), region=(100, 100,200); num_tiles=1, tile_id[ ]=(1);
  item2: ObjectInfoProperty: object_ID=10; item_ID=102
    ItemSpatialInfoProperty: sub_region_contained=0; tile_id_present=1 inital_region_id=0;
  R2: 3d_region_id=1002, anchor=(100.0,0), region=(100, 100,200); num_tiles=1, tile_id[ ]=(2);
  GPCCItemGroupBox:
  initial_item_ID=101; partial_item_flag=1;
  R1+R2: 3d_region_id=0001, anchor=(0.0,0), region=(200,100,200);

F2:
  item3: ObjectInfoProperty: object_ID=10; item_ID=103
    ItemSpatialInfoProperty: sub_region_contained=0; tile_id_present=1 inital_region_id=0;
  R3: 3d_region_id=1003, anchor=(0,100,0), region=(100, 100,200); num_tiles=1, tile_id[ ]=(3);
  item4: ObjectInfoProperty: object_ID=10; item_ID=104
    ItemSpatialInfoProperty: sub_region_contained=0; tile_id_present=1 initial_region_id=0;
  R4: 3d_region_id=1004, anchor=(100,100,0), region=(100,100,200); num_tiles=1, tile_id[ ]=(4);
  GPCCItemGroupBox:
  initial_item_ID=103; partial_item_flag=1;
  R3+R4: 3d_region_id=0002, anchor=(0,100,0), region=(200,100,200);

The video production device transmits MPD signaling of F1 and F2 to the user. Object_ID, the spatial region, the spatial sub-region, and the tile identifier information are the same as those in point cloud media encapsulation, and details are not described herein again.

A user U1 requests consumption of F1, and a user U2 requests consumption of F2.

The video production device respectively transmits F1 to a video playback device corresponding to the user U1 and F2 to a video playback device corresponding to the user U2.

After the video playback device corresponding to U1 receives F1, item1 is initially viewed. An initial viewing region of item1 is an entire viewing space of item1. Therefore, the U1 consumes the entire item1. Since F1 includes item1 and item2 corresponding to tile1 and tile2 respectively, when U1 consumes item1, a part of the bitstream corresponding to tile1 can be directly decoded for presentation. When U1 continues to consume and view a region of item2, and a corresponding tile ID is 2, a part corresponding to the tile '2' in the overall bitstream is directly decoded for presentation and consumption. When the U1 continues to consume and needs to view a region corresponding to item3, F2 is requested according to the MPD file. After being received, F2 is presented and consumed directly according to a region viewed by the user, and information about an initially consumed item and information about an initially viewed region in F2 are not determined any more.

After the video playback device corresponding to U2 receives F2, item3 is initially viewed. An initial viewing region of item3 is an entire viewing space of item3. Therefore, the U2 consumes the entire item3. Since F2 includes item3 and item4 corresponding to tile3 and tile4 respectively, when U2 consumes item3, a part of the bitstream corresponding to tile3 can be directly decoded for presentation.

Figure 5:
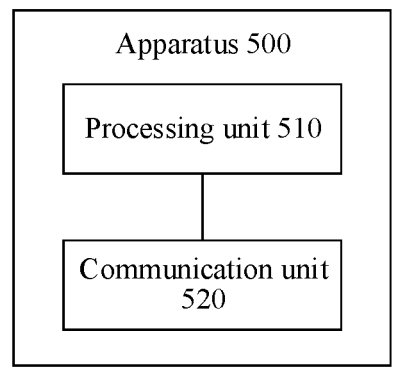
FIG. 5 is a schematic diagram of an apparatus 500 for processing non-sequential point cloud media according to an embodiment of this application.

FIG. 5 is a schematic diagram of an apparatus 500 for processing non-sequential point cloud media according to an embodiment of this application. The apparatus 500 includes a processing unit 510 and a communication unit 520. The processing unit 510 is configured to: obtain non-sequential point cloud data of a static object; process the non-sequential point cloud data using a GPCC coding scheme to obtain a GPCC bitstream; encapsulate the GPCC bitstream to generate an item of at least one GPCC region, the item of the GPCC region being used to represent a GPCC component of a 3D spatial region corresponding to the GPCC region; encapsulate the item of the at least one GPCC region to generate at least one piece of non-sequential point cloud media of the static object, the non-sequential point cloud media including an identifier of the static object; and transmit MPD signaling of the at least one piece of non-sequential point cloud media to a video playback device. The communication unit 520 is configured to: receive a first request message transmitted by the video playback device according to the MPD signaling, the first request message being used to request first non-sequential point cloud media in the at least one piece of non-sequential point cloud media; and transmit the first non-sequential point cloud media to the video playback device according to the first request message.

In some embodiments, an item of a target GPCC region includes: an item property of the 3D spatial region, the item property of the 3D spatial region including: a first identifier and a second identifier. The target GPCC region is a GPCC region in at least one GPCC region. The first identifier is used to identify whether the target 3D spatial region corresponding to the target GPCC region is divided into a plurality of spatial sub-regions. The second identifier is used to identify whether a GPCC coding scheme is adopted for the target GPCC region.

In some embodiments, when the target 3D spatial region corresponding to the target GPCC region is divided into a plurality of spatial sub-regions the item property of the 3D spatial region further includes: information about the plurality of spatial sub-regions and information about the target 3D spatial region.

In some embodiments, for any spatial sub-region in the plurality of spatial sub-regions, the information about the spatial sub-region includes at least one of the following: an identifier of the spatial sub-region, location information of the spatial sub-region, or a tile identifier of the spatial sub-region when the GPCC tile coding scheme is adopted for the target GPCC region. The information about the target 3D spatial region includes at least one of the following: an identifier of the target 3D spatial region, location information of the target 3D spatial region, or a quantity of spatial sub-regions included in the target 3D spatial region.

In some embodiments, when the target 3D spatial region corresponding to the target GPCC region is divided into a plurality of spatial sub-regions, the item property of the 3D spatial region further includes a third identifier. When a value of the third identifier is a first value or null, indicating that the item corresponding to the target GPCC region is an item initially presented by the video playback device, for the target 3D spatial region and the spatial sub-regions of the target 3D spatial region, the video playback device initially presents the target 3D spatial region. When the value of the third identifier is a second value, indicating that the item corresponding to the target GPCC region is the item initially presented by the video playback device, for the target 3D spatial region and the spatial sub-regions of the target 3D spatial region, the video playback device initially presents a spatial sub-region corresponding to the second value in the target 3D spatial region.

In some embodiments, when the target 3D spatial region corresponding to the target GPCC region is not divided into a plurality of spatial sub-regions, the item property of the 3D spatial region further includes: information about the target 3D spatial region.

In some embodiments, the information about the target 3D spatial region includes at least one of the following: an identifier of the target 3D spatial region, location information of the target 3D spatial region, or a tile identifier of the target 3D spatial region when the GPCC tile coding scheme is adopted for the target GPCC region.

In some embodiments, the processing unit 510 is further configured to: encapsulate, when a quantity of items of the at least one GPCC region is one, an item of one GPCC region into one piece of non-sequential point cloud media; and encapsulate, when a quantity of items of the at least one GPCC region is N, items of N GPCC regions into M pieces of non-sequential point cloud media. N is an integer greater than 1, 1≤M≤N, and M is an integer.

In some embodiments, second non-sequential point cloud media includes a GPCC item group box. The second non-sequential point cloud media is any piece of non-sequential point cloud media including items of a plurality of GPCC regions in the at least one piece of non-sequential point cloud media. The GPCC item group box is used to associate the items of the plurality of GPCC regions.

In some embodiments, the GPCC item group box includes a fourth identifier. The fourth identifier is an identifier of an item initially presented by the video playback device in the items of the plurality of GPCC regions.

In some embodiments, the GPCC item group box includes a fifth identifier. When a value of the fifth identifier is a third value, it indicates that the items of the plurality of GPCC regions constitute a complete GPCC frame of the static object. When the value of the fifth identifier is a fourth value, the items of the plurality of GPCC regions constitute a partial GPCC frame of the static object.

In some embodiments, the GPCC item group box includes: location information of a GPCC region constituted by the plurality of GPCC regions.

In some embodiments, the communication unit 520 is further configured to: receive a second request message transmitted by the video playback device based on the identifier of the static object, the second request message being used to request third non-sequential point cloud media in the at least one piece of non-sequential point cloud media; and transmit the third non-sequential point cloud media to the video playback device according to the second request message.

It is to be understood that the apparatus embodiment and the method embodiment are corresponding to each other and for a similar description, refer to the method embodiment. To avoid repetition, details are not described herein again. Specifically, the apparatus 500 shown in FIG. 5 can perform the method embodiment corresponding to the video production device, and the foregoing and other operations and/or functions of modules in the apparatus 500 are respectively used to implement the method embodiment corresponding to the video production device. For brevity, details are not described herein again.

The apparatus 500 provided in this embodiment in this application is described above from the perspective of functional modules with reference to the accompanying drawings. It is to be understood that the function module may be implemented in the form of hardware, or may be implemented by instructions in the form of software, or may be implemented by a combination of hardware and software modules. Specifically, steps of the method embodiment of the embodiments in this application can be accomplished by the integrated logic circuit in the hardware in the processor and/or instructions in the form of software, and the steps of the methods disclosed with reference to the embodiments of this application may be directly executed and accomplished by using a hardware decoding processor, or may be executed and accomplished by using a combination of hardware and software modules in a decoding processor. In some embodiments, the software module may be stored in a storage medium that is mature in the art, such as a RAM, a flash memory, a ROM, a programmable ROM, an electrically erasable programmable memory, and a register. The storage medium is located in the memory. The processor reads information in the memory and accomplishes the steps of the foregoing method embodiment in combination with hardware thereof.

Figure 6:
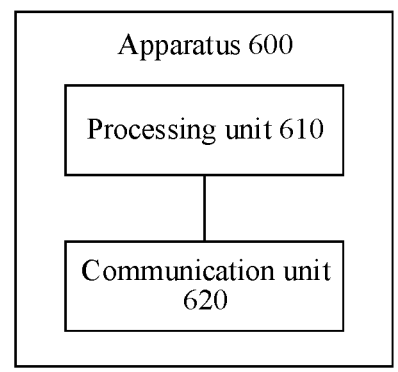
FIG. 6 is a schematic diagram of an apparatus 600 for processing non-sequential point cloud media according to an embodiment of this application.

FIG. 6 is a schematic diagram of an apparatus 600 for processing non-sequential point cloud media according to an embodiment of this application. The apparatus 600 includes a processing unit 610 and a communication unit 620. The communication unit 620 is configured to: receive MPD signaling of at least one piece of non-sequential point cloud media, the non-sequential point cloud media including an identifier of a static object; transmit a first request message to a video production device according to the MPD signaling, the first request message being used to request first non-sequential point cloud media in the at least one piece of non-sequential point cloud media; and receive the first non-sequential point cloud media from the video production device. The processing unit 610 is configured to play the first non-sequential point cloud media. The at least one piece of non-sequential point cloud media is generated by encapsulating an item of at least one GPCC region, the item of the at least one GPCC region is generated by encapsulating a GPCC bitstream, and the GPCC bitstream is generated by processing non-sequential point cloud data of the static object using a GPCC coding scheme. For an item of any GPCC region in the item of the at least one GPCC region, the item of the GPCC region is used to represent a GPCC component of a 3D spatial region corresponding to the GPCC region.

In some embodiments, an item of a target GPCC region includes: an item property of the 3D spatial region, the item property of the 3D spatial region including: a first identifier and a second identifier. The target GPCC region is a GPCC region in at least one GPCC region. The first identifier is used to identify whether the target 3D spatial region corresponding to the target GPCC region is divided into a plurality of spatial sub-regions. The second identifier is used to identify whether a GPCC coding scheme is adopted for the target GPCC region.

In some embodiments, when the target 3D spatial region corresponding to the target GPCC region is divided into a plurality of spatial sub-regions the item property of the 3D spatial region further includes: information about the plurality of spatial sub-regions and information about the target 3D spatial region.

In some embodiments, for any spatial sub-region in the plurality of spatial sub-regions, the information about the spatial sub-region includes at least one of the following: an identifier of the spatial sub-region, location information of the spatial sub-region, or a tile identifier of the spatial sub-region when the GPCC tile coding scheme is adopted for the target GPCC region. The information about the target 3D spatial region includes at least one of the following: an identifier of the target 3D spatial region, location information of the target 3D spatial region, or a quantity of spatial sub-regions included in the target 3D spatial region.

In some embodiments, when the target 3D spatial region corresponding to the target GPCC region is divided into a plurality of spatial sub-regions, the item property of the 3D spatial region further includes a third identifier. When a value of the third identifier is a first value or null, indicating that the item corresponding to the target GPCC region is an item initially presented by the video playback device, for the target 3D spatial region and the spatial sub-regions of the target 3D spatial region, the video playback device initially presents the target 3D spatial region. When the value of the third identifier is a second value, indicating that the item corresponding to the target GPCC region is the item initially presented by the video playback device, for the target 3D spatial region and the spatial sub-regions of the target 3D spatial region, the video playback device initially presents a spatial sub-region corresponding to the second value in the target 3D spatial region.

In some embodiments, when the target 3D spatial region corresponding to the target GPCC region is not divided into a plurality of spatial sub-regions, the item property of the 3D spatial region further includes: information about the target 3D spatial region.

In some embodiments, the information about the target 3D spatial region includes at least one of the following: an identifier of the target 3D spatial region, location information of the target 3D spatial region, or a tile identifier of the target 3D spatial region when the GPCC tile coding scheme is adopted for the target GPCC region.

In some embodiments, when a quantity of items of the at least one GPCC region is one, an item of one GPCC region is encapsulated into one piece of non-sequential point cloud media. When a quantity of items of the at least one GPCC region is N, items of N GPCC regions are encapsulated into M pieces of non-sequential point cloud media. N is an integer greater than 1, 1≤M≤N, and M is an integer.

In some embodiments, second non-sequential point cloud media includes a GPCC item group box. The second non-sequential point cloud media is any piece of non-sequential point cloud media including items of a plurality of GPCC regions in the at least one piece of non-sequential point cloud media. The GPCC item group box is used to associate the items of the plurality of GPCC regions.

In some embodiments, the GPCC item group box includes a fourth identifier. The fourth identifier is an identifier of an item initially presented by the video playback device in the items of the plurality of GPCC regions.

In some embodiments, the GPCC item group box includes a fifth identifier. When a value of the fifth identifier is a third value, the items of the plurality of GPCC regions constitute a complete GPCC frame of the static object. When the value of the fifth identifier is a fourth value, the items of the plurality of GPCC regions constitute a partial GPCC frame of the static object.

In some embodiments, the GPCC item group box includes: location information of a GPCC region constituted by the plurality of GPCC regions.

In some embodiments, the communication unit 620 is further configured to transmit a second request message to the video production device according to the MPD signaling; and receive second non-sequential point cloud media.

In some embodiments, the processing unit 610 is further configured to play the second non-sequential point cloud media.

It is to be understood that the apparatus embodiment and the method embodiment are corresponding to each other and for a similar description, refer to the method embodiment. To avoid repetition, details are not described herein again. Specifically, the apparatus 600 shown in FIG. 6 can perform the method embodiment corresponding to the video playback device, and the foregoing and other operations and/or functions of modules in the apparatus 600 are respectively used to implement the method embodiment corresponding to the video playback device. For brevity, details are not described herein again.

The apparatus 600 provided in this embodiment in this application is described above from the perspective of functional modules with reference to the accompanying drawings. It is to be understood that the function module may be implemented in the form of hardware, or may be implemented by instructions in the form of software, or may be implemented by a combination of hardware and software modules. Specifically, steps of the method embodiment of the embodiments in this application can be accomplished by integrated logic circuit in the hardware in the processor and/or instructions in the form of software, and the steps of the methods disclosed with reference to the embodiments of this application may be directly executed and accomplished by using a hardware decoding processor, or may be executed and accomplished by using a combination of hardware and software modules in a decoding processor. In some embodiments, the software module may be stored in a storage medium that is mature in the art, such as a RAM, a flash memory, a ROM, a programmable ROM, an electrically erasable programmable memory, and a register. The storage medium is located in the memory. The processor reads information in the memory and accomplishes the steps of the foregoing method embodiment in combination with hardware thereof.

Embodiment 8

Figure 7:
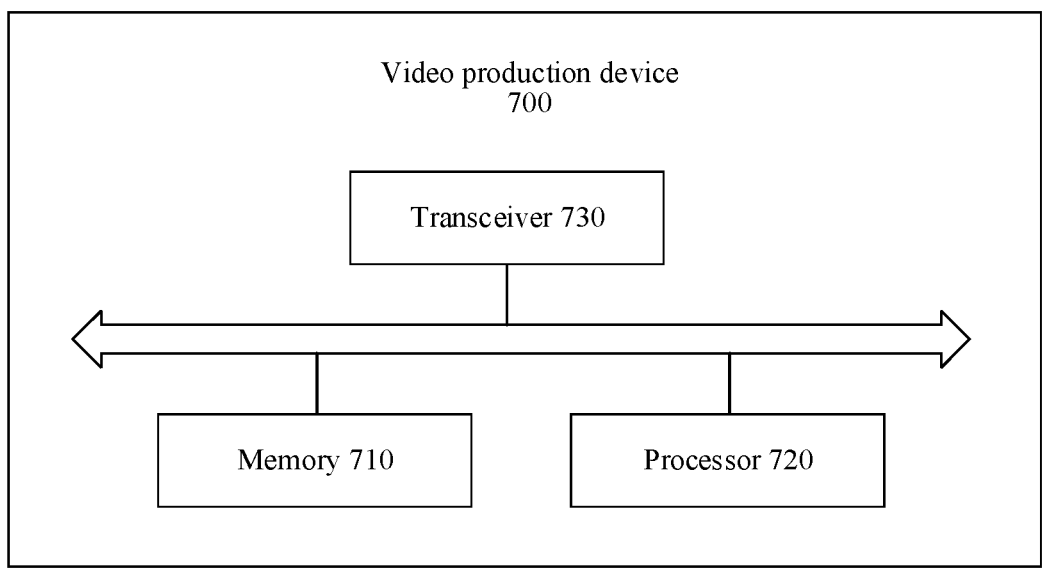
FIG. 7 is a schematic block diagram of a video production device 700 according to an embodiment of this application.

FIG. 7 is a schematic block diagram of a video production device 700 according to an embodiment of this application.

As shown in FIG. 7, the video production device 700 may include:

a memory 710 and a processor 720, the memory 710 being configured to store a computer program and transmit the program code to the processor 720. In other words, the processor 720 may invoke the computer program from the memory 710 and run the computer program, to implement the method in the embodiments of this application.

For example, the processor 720 can be configured to perform the method embodiment according to instructions in the computer program.

In some embodiments of this application, the processor 720 may include, but is not limited to:

a general processor, a digital signal processor (DSP), an application-specific integrated circuit (ASIC), a field programmable gate array (FPGA), another programmable logic device, a discrete gate, a transistor logic device, or a discrete hardware component.

In some embodiments of this application, the memory 710 includes, but is not limited to:

a volatile memory and/or a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), used as an external cache. Through exemplary but not limitative description, many forms of RAMs may be used, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a sync link DRAM (SLDRAM), and a Direct Rambus RAM (DR RAM).

In some embodiments of this application, the computer program can be divided into one or more modules, the one or more modules being stored in the memory 710 and executed by the processor 720 to implement the method provided in this application. The one or more modules may be a series of computer program instruction segments capable of performing a particular function, the instruction segments being used to describe execution of the computer program in the video production device.

As shown in FIG. 7, the video production device may further include:

a transceiver 730. The transceiver 730 may be connected to the processor 720 or the memory 710.

The processor 720 can control the transceiver 730 to communicate with another device, and specifically, may transmit information or data to another device, or receive information or data transmitted by another device. The transceiver 730 may include a transmitter and a receiver. The transceiver 730 may further include an antenna, and a quantity of the antenna can be one or more.

It is to be understood that various components of the video production device are connected to each other by a bus system. In addition to including a data bus, the bus system further includes a power bus, a control bus, and a status signal bus.

Embodiment 9

Figure 8:
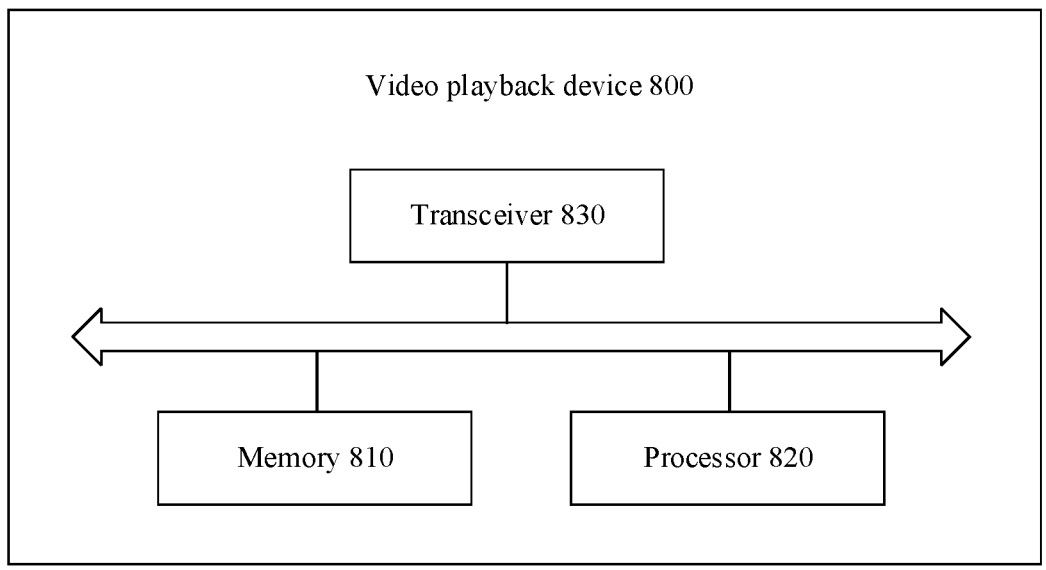
FIG. 8 is a schematic block diagram of a video playback device 800 according to an embodiment of this application.

FIG. 8 is a schematic block diagram of a video playback device 800 according to an embodiment of this application.

As shown in FIG. 8, the video playback device 800 may include:

a memory 810 and a processor 820, the memory 810 being configured to store a computer program and transmit the program code to the processor 820. In other words, the processor 820 may invoke the computer program from the memory 810 and run the computer program, to implement the method in the embodiments of this application.

For example, the processor 820 can be configured to perform the method embodiment according to instructions in the computer program.

In some embodiments of this application, the processor 820 may include, but is not limited to:

a general-purpose processor, a DSP, an ASIC, an FPGA, another programmable logical device, a discrete gate or transistor logic device, or a discrete hardware component.

In some embodiments of this application, the memory 810 includes, but is not limited to:

a volatile memory and/or a non-volatile memory. The non-volatile memory may be a ROM, a PROM, an EPROM, an EEPROM, or a flash memory. The volatile memory may be a RAM, and is used as an external cache. Many forms of RAMs, for example, an SRAM, a DRAM, an SDRAM, a DDR SDRAM, an ESDRAM, an SLDRAM, and a DR RAM can be used. This is used only as an example, but is not intended for limitative descriptions.

In some embodiments of this application, the computer program can be divided into one or more modules, the one or more modules being stored in the memory 810 and executed by the processor 820 to implement the method provided in this application. The one or more modules may be a series of computer program instruction segments capable of performing a particular function, the instruction segments being used to describe execution of the computer program in the video playback device.

As shown in FIG. 8, the video playback device may further include:

a transceiver 830. The transceiver 830 may be connected to the processor 820 or the memory 810.

The processor 820 can control the transceiver 830 to communicate with another device, and specifically, may transmit information or data to another device, or receive information or data transmitted by another device. The transceiver 830 may include a transmitter and a receiver. The transceiver 830 may further include an antenna, and a quantity of the antenna can be one or more.

It is to be understood that various components of the video playback device are connected to each other by a bus system. In addition to including a data bus, the bus system further includes a power bus, a control bus, and a status signal bus.

This application further provides a computer-readable storage medium, storing a computer program, the computer program, when run on a computer, enabling the computer to perform the method according to the foregoing method embodiments. In other words, the embodiments of this application further provide a computer program product including instructions, the instructions, when run on a computer, enabling the computer to perform the method according to the foregoing method embodiments.

When software is used to implement the embodiment, the embodiment may be implemented completely or partially in a form of a computer program product. The computer program product includes one or more computer instructions. When the program instruction of the computer is loaded and executed on the computer, all or some of the steps are generated according to the process or function described in the embodiments of this application. The computer may be a general-purpose computer, a special-purpose computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server or data center to another website, computer, server or data center in a wired (for example, a coaxial cable, an optical fiber or a digital subscriber line (DSL)) or wireless (for example, infrared, wireless or microwave) manner. The computer-readable storage medium may be any usable medium accessible by the computer, or a data storage device, such as a server or a data center, including one or more usable media. The available medium may be a magnetic medium (such as a floppy disk, a hard disk, or a magnetic tape), an optical medium (such as a digital video disc (DVD)), a semiconductor medium (such as a solid state disk (SSD)) or the like.

A person of ordinary skill in the art may be aware that, in combination with the examples described in the embodiments disclosed in this specification, modules and algorithm steps may be implemented by electronic hardware or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

In the several embodiments provided in this application, it is to be understood that the disclosed system, apparatus, and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network units. Some or all of the modules may be selected according to actual requirements to implement the objectives of the solutions of the embodiments. For example, functional modules in the embodiments of this application may be integrated into one processing module, or each of the modules may exist alone physically, or two or more modules may be integrated into one module.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for processing non-sequential point cloud media, performed by a computer device, the method comprising:

obtaining non-sequential point cloud data of a static object;

processing the non-sequential point cloud data using a Geometry-based Point Cloud Compression (GPCC) coding scheme to obtain a GPCC bitstream;

encapsulating the GPCC bitstream to generate an item of at least one GPCC region, the item of the GPCC region being used to represent a GPCC component of a three-dimensional (3D) spatial region corresponding to the GPCC region;

encapsulating the item of the at least one GPCC region to generate at least one piece of non-sequential point cloud media of the static object, the non-sequential point cloud media comprising an identifier of the static object, wherein the item of the at least one GPCC region includes an item of a target GPCC region that comprises: an item property of the 3D spatial region, the item property of the 3D spatial region comprising a first identifier used to identify whether a target 3D spatial region corresponding to the target GPCC region is divided into a plurality of spatial sub-regions, and a second identifier used to identify whether a GPCC tile coding scheme is adopted for the target GPCC region;

transmitting media presentation description (MPD) signaling of the at least one piece of non-sequential point cloud media to a video playback device;

receiving a first request message transmitted by the video playback device according to the MPD signaling, the first request message being used to request first non-sequential point cloud media in the at least one piece of non-sequential point cloud media; and transmitting the first non-sequential point cloud media to the video playback device according to the first request message.

2. The method according to claim 1, wherein when the target 3D spatial region corresponding to the target GPCC region is divided into a plurality of spatial sub-regions, the item property of the 3D spatial region further comprises: a third identifier;

when a value of the third identifier is a first value or null, indicating that the item corresponding to the target GPCC region is an item initially presented by the video playback device, for the target 3D spatial region and the spatial sub-regions of the target 3D spatial region, the video playback device initially presents the target 3D spatial region; and when the value of the third identifier is a second value, indicating that the item corresponding to the target GPCC region is the item initially presented by the video playback device, for the target 3D spatial region and the spatial sub-regions of the target 3D spatial region, the video playback device initially presenting a spatial sub-region corresponding to the second value in the target 3D spatial region.

3. The method according to claim 1, wherein when the target 3D spatial region corresponding to the target GPCC region is not divided into a plurality of spatial sub-regions, the item property of the 3D spatial region further comprises information about the target 3D spatial region.

4. The method according to claim 1, wherein the encapsulating the item of the at least one GPCC region to generate at least one piece of non-sequential point cloud media of the static object comprises:

encapsulating, when a quantity of items of the at least one GPCC region is one, an item of one GPCC region into one piece of non-sequential point cloud media; and encapsulating, when a quantity of items of the at least one GPCC region is N, items of N GPCC regions into M pieces of non-sequential point cloud media, p1 N being an integer greater than 1, 1≤M<N, and M being an integer.

5. The method according to claim 1, wherein second non-sequential point cloud media comprises a GPCC item group box, the second non-sequential point cloud media being any piece of non-sequential point cloud media comprising items of a plurality of GPCC regions in the at least one piece of non-sequential point cloud media, and the GPCC item group box being used to associate the items of the plurality of GPCC regions.

6. The method according to claim 1, wherein, after the transmitting the first non-sequential point cloud media to the video playback device according to the first request message, the method further comprises:

receiving a second request message transmitted by the video playback device based on the identifier of the static object, the second request message being used to request third non-sequential point cloud media in the at least one piece of non-sequential point cloud media; and transmitting the third non-sequential point cloud media to the video playback device according to the second request message.

7. A computer device, comprising:

a processor and a memory, the memory being configured to store a computer program, and the processor being configured to invoke and execute the computer program stored in the memory and causing the computer device to perform a method for processing non-sequential point cloud media including:

obtaining non-sequential point cloud data of a static object;

processing the non-sequential point cloud data using a Geometry-based Point Cloud Compression (GPCC) coding scheme to obtain a GPCC bitstream;

encapsulating the GPCC bitstream to generate an item of at least one GPCC region, the item of the GPCC region being used to represent a GPCC component of a three-dimensional (3D) spatial region corresponding to the GPCC region;

encapsulating the item of the at least one GPCC region to generate at least one piece of non-sequential point cloud media of the static object, the non-sequential point cloud media comprising an identifier of the static object, wherein the item of the at least one GPCC region includes an item of a target GPCC region that comprises: an item property of the 3D spatial region, the item property of the 3D spatial region comprising a first identifier used to identify whether a target 3D spatial region corresponding to the target GPCC region is divided into a plurality of spatial sub-regions, and a second identifier used to identify whether a GPCC tile coding scheme is adopted for the target GPCC region;

transmitting media presentation description (MPD) signaling of the at least one piece of non-sequential point cloud media to a video playback device;

receiving a first request message transmitted by the video playback device according to the MPD signaling, the first request message being used to request first non-sequential point cloud media in the at least one piece of non-sequential point cloud media; and transmitting the first non-sequential point cloud media to the video playback device according to the first request message.

8. The computer device according to claim 7, wherein when the target 3D spatial region corresponding to the target GPCC region is divided into a plurality of spatial sub-regions, the item property of the 3D spatial region further comprises: a third identifier;

when a value of the third identifier is a first value or null, indicating that the item corresponding to the target GPCC region is an item initially presented by the video playback device, for the target 3D spatial region and the spatial sub-regions of the target 3D spatial region, the video playback device initially presents the target 3D spatial region; and when the value of the third identifier is a second value, indicating that the item corresponding to the target GPCC region is the item initially presented by the video playback device, for the target 3D spatial region and the spatial sub-regions of the target 3D spatial region, the video playback device initially presenting a spatial sub-region corresponding to the second value in the target 3D spatial region.

9. The computer device according to claim 7, wherein when the target 3D spatial region corresponding to the target GPCC region is not divided into a plurality of spatial sub-regions, the item property of the 3D spatial region further comprises information about the target 3D spatial region.

10. The computer device according to claim 7, wherein the encapsulating the item of the at least one GPCC region to generate at least one piece of non-sequential point cloud media of the static object comprises:

encapsulating, when a quantity of items of the at least one GPCC region is one, an item of one GPCC region into one piece of non-sequential point cloud media; and encapsulating, when a quantity of items of the at least one GPCC region is N, items of N GPCC regions into M pieces of non-sequential point cloud media, N being an integer greater than 1, 1≤M≤N, and M being an integer.

11. The computer device according to claim 7, wherein second non-sequential point cloud media comprises a GPCC item group box, the second non-sequential point cloud media being any piece of non-sequential point cloud media comprising items of a plurality of GPCC regions in the at least one piece of non-sequential point cloud media, and the GPCC item group box being used to associate the items of the plurality of GPCC regions.

12. The computer device according to claim 7, wherein, after the transmitting the first non-sequential point cloud media to the video playback device according to the first request message, the method further comprises:

receiving a second request message transmitted by the video playback device based on the identifier of the static object, the second request message being used to request third non-sequential point cloud media in the at least one piece of non-sequential point cloud media; and transmitting the third non-sequential point cloud media to the video playback device according to the second request message.

13. A non-transitory computer-readable storage medium, storing a computer program, the computer program, when executed by a processor of a computer device, causing the computer device to perform a method for processing non-sequential point cloud media including:

obtaining non-sequential point cloud data of a static object;

processing the non-sequential point cloud data using a Geometry-based Point Cloud Compression (GPCC) coding scheme to obtain a GPCC bitstream;

encapsulating the item of the at least one GPCC region to generate at least one piece of non-sequential point cloud media of the static object, the non-sequential point cloud media comprising an identifier of the static object, wherein the item of the at least one GPCC region includes an item of a target GPCC region that comprises: an item property of the 3D spatial region, the item property of the 3D spatial region comprising a first identifier used to identify whether a target 3D spatial region corresponding to the target GPCC region is divided into a plurality of spatial sub-regions, and a second identifier used to identify whether a GPCC tile coding scheme is adopted for the target GPCC region;

encapsulating the item of the at least one GPCC region to generate at least one piece of non-sequential point cloud media of the static object, the non-sequential point cloud media comprising an identifier of the static object;

transmitting media presentation description (MPD) signaling of the at least one piece of non-sequential point cloud media to a video playback device;

receiving a first request message transmitted by the video playback device according to the MPD signaling, the first request message being used to request first non-sequential point cloud media in the at least one piece of non-sequential point cloud media; and transmitting the first non-sequential point cloud media to the video playback device according to the first request message.

14. The non-transitory computer-readable storage medium according to claim 13, wherein when the target 3D spatial region corresponding to the target GPCC region is not divided into a plurality of spatial sub-regions, the item property of the 3D spatial region further comprises information about the target 3D spatial region.

15. The non-transitory computer-readable storage medium according to claim 13, wherein the encapsulating the item of the at least one GPCC region to generate at least one piece of non-sequential point cloud media of the static object comprises:

encapsulating, when a quantity of items of the at least one GPCC region is one, an item of one GPCC region into one piece of non-sequential point cloud media; and encapsulating, when a quantity of items of the at least one GPCC region is N, items of N GPCC regions into M pieces of non-sequential point cloud media, N being an integer greater than 1, $1 \leq M \leq N$, and M being an integer.

16. The non-transitory computer-readable storage medium according to claim 13, wherein second non-sequential point cloud media comprises a GPCC item group box, the second non-sequential point cloud media being any piece of non-sequential point cloud media comprising items of a plurality of GPCC regions in the at least one piece of non-sequential point cloud media, and the GPCC item group box being used to associate the items of the plurality of GPCC regions.

17. The non-transitory computer-readable storage medium according to claim 13, wherein, after the transmitting the first non-sequential point cloud media to the video playback device according to the first request message, the method further comprises:

receiving a second request message transmitted by the video playback device based on the identifier of the static object, the second request message being used to request third non-sequential point cloud media in the at least one piece of non-sequential point cloud media; and transmitting the third non-sequential point cloud media to the video playback device according to the second request message.

* * * * *